United States Patent
Tseng

[11] Patent Number: 6,049,982
[45] Date of Patent: Apr. 18, 2000

[54] INTEGRATED MOLDING METHOD FOR THE FRONT FORK OF A BICYCLE

[76] Inventor: Shao-Chien Tseng, No. 130, Sec 2, Yang-Shin Rd., Yang-Mei Taoyuan 326, Taiwan

[21] Appl. No.: 09/083,632

[22] Filed: May 22, 1998

[51] Int. Cl.[7] .................................................. B23P 15/12
[52] U.S. Cl. ........................... 29/897.2; 29/557; 280/279
[58] Field of Search .................... 29/897.2, 557, 29/558; 280/279, 280

[56] References Cited

U.S. PATENT DOCUMENTS

| | | | |
|---|---|---|---|
| 2,739,047 | 3/1956 | Sanz | 29/557 |
| 2,747,889 | 5/1956 | Mueller | 29/897.2 |
| 3,927,450 | 12/1975 | Sommer et al. | 29/558 |
| 4,305,269 | 12/1981 | Kimura | 72/58 |
| 4,786,219 | 11/1988 | Oberlin et al. | 29/558 |
| 4,828,285 | 5/1989 | Foret et al. | 280/279 |
| 4,830,390 | 5/1989 | Yamaki et al. | 280/280 |
| 4,907,735 | 3/1990 | Ushioda et al. | 29/897.2 |
| 5,011,172 | 4/1991 | Bellanca et al. | 280/281.1 |
| 5,181,732 | 1/1993 | Bezin et al. | 280/279 |
| 5,273,301 | 12/1993 | Klein | 280/279 |
| 5,412,860 | 5/1995 | Miyauchi et al. | 29/557 |
| 5,692,764 | 12/1997 | Klein et al. | 280/279 |
| 5,762,352 | 6/1998 | Lee | 280/280 |

FOREIGN PATENT DOCUMENTS

| | | | |
|---|---|---|---|
| 626852 | 9/1961 | Canada | 29/897.2 |
| 5-220534 | 8/1993 | Japan | 29/897.2 |
| 742072 | 4/1953 | United Kingdom | 29/557 |
| 1596002 | 8/1981 | United Kingdom | 29/897.2 |

OTHER PUBLICATIONS

Milling High–Strength Alloys, May 1961.

*Primary Examiner*—I Cuda
*Assistant Examiner*—Trinh T. Nguyen
*Attorney, Agent, or Firm*—Pro-Techtor International Services

[57] ABSTRACT

An integrate forming method for a front aluminum alloy fork of a bicycle, wherein, an aluminum alloy found round pipe having two elliptical pipe holes therein is selected as a blank and is formed an embryonic form of a pipe casting of the pipe head of the front fork by a milling process, then die cores are placed in the pipe casting then by using a sequential novel process including diameter reducing and tapering of the pipe head, a first stage forming, tapering of the branch pipes, a second stage forming, and bending forging etc., the front aluminum alloy fork can be integrately formed, in this way, the pipe head and the two branch pipes having extremely large variation of shape can be integrately formed, and the disadvantage of stress concentration in the conventional connecting and fixing technique can be gotten rid of, and good appearance as well as strength of the front fork can be improved by such a process.

2 Claims, 9 Drawing Sheets

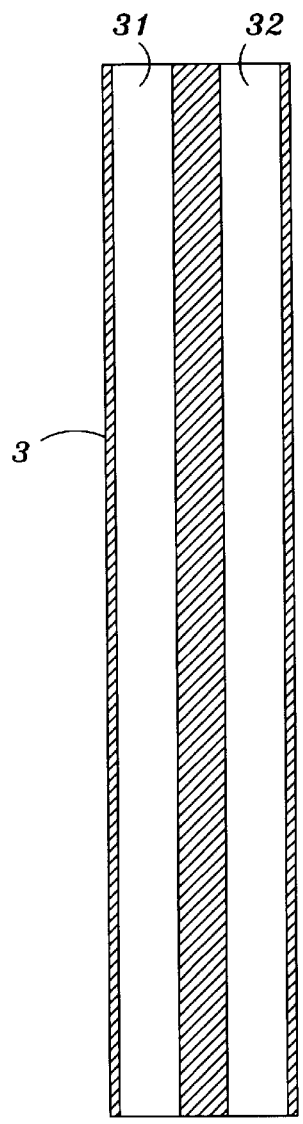
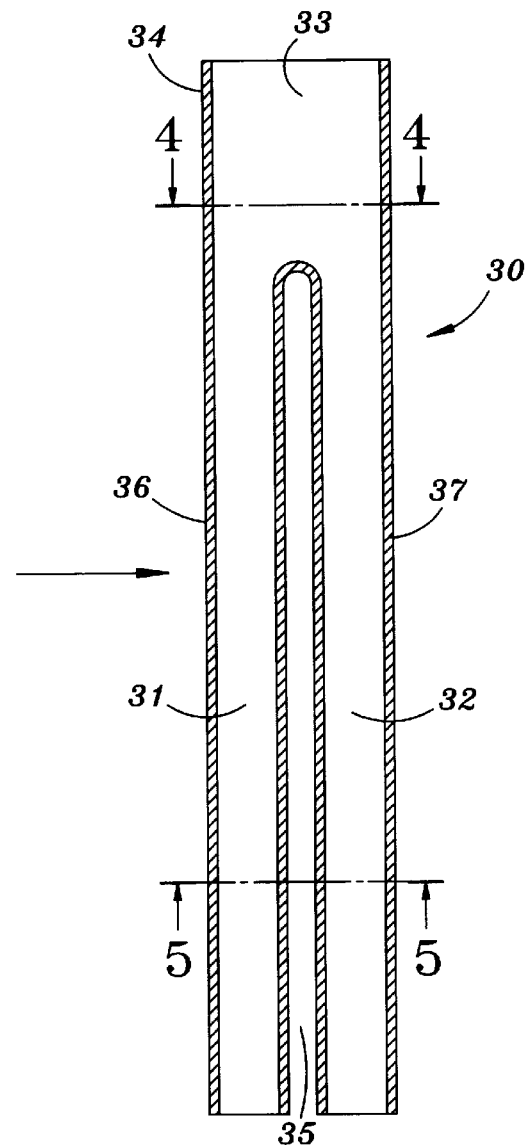
Fig. 3
Fig. 3a
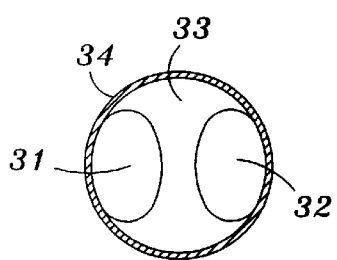
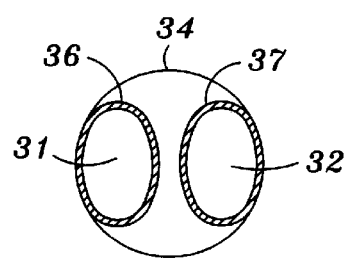
Fig. 4
Fig. 5

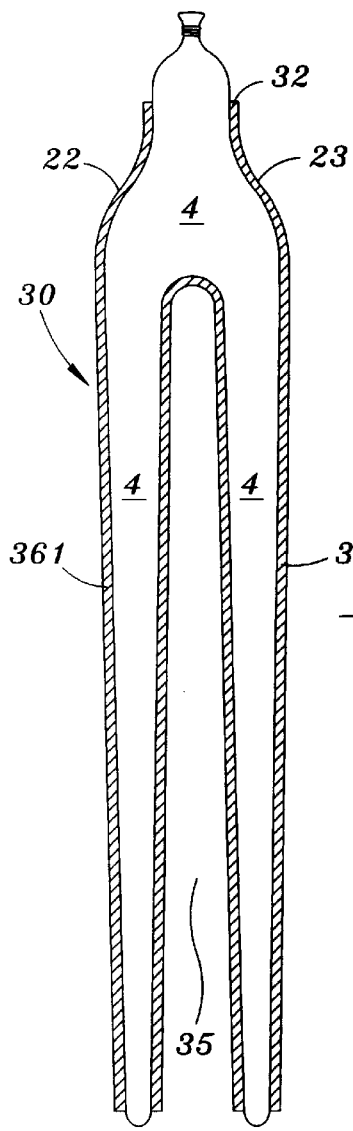 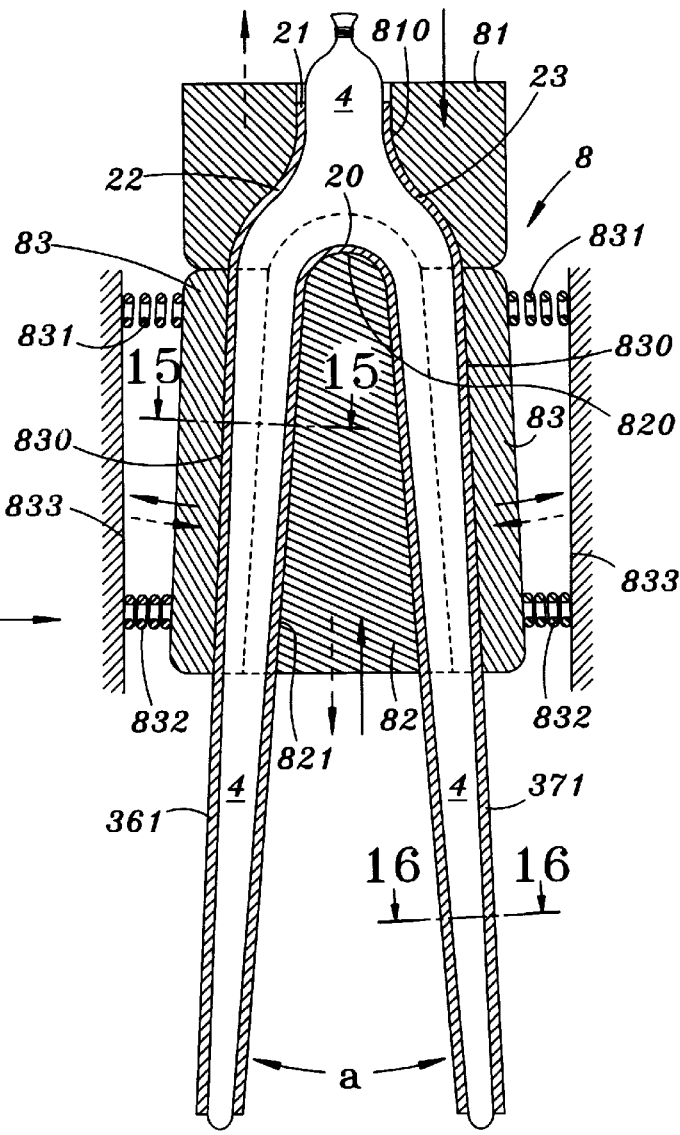
Fig.14  Fig.14a
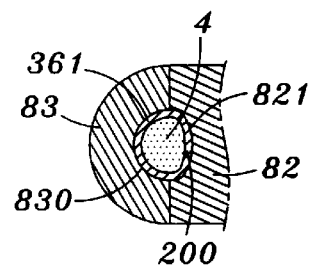 
Fig.15  Fig.16

1

INTEGRATED MOLDING METHOD FOR THE FRONT FORK OF A BICYCLE

BACKGROUND OF THE INVENTION

1. Field of the Invention

The present invention is related to an integrate forming method for the front aluminum alloy fork of a bicycle, and especially to the method wherein an aluminum alloy extrusion pipe having therein two elliptical pipe holes is used as a blank and is milled by a milling machine to form in advance a pipe casting of the front fork; then taking advantage of plasticity of the die core filled with plastic and the characteristic favorable for taking off die cores from the shaped pipe holes, the casting of the front fork can have adequate strength for the processes of forming of a pipe head, a first stage forming of branch pipes, a second stage forming and bending forging etc. to thereby make a round pipe head and two arciform branch pipes of the front aluminum alloy fork of the bicycle connect together, and thus the pipe head and the branch pipes can be integrately formed, so that strength and good appearance of the front aluminum alloy fork of the bicycle without sealing the joints with adhesive thereon can be improved.

2. Description of the Prior Art

As is known, the front aluminum alloy fork 1 of a bicycle (as shown in FIG. 1) is formed by connecting the two legs of a round pipe head 11 respectively to two tapered branch pipes 12, 13 with the diameters thereof reduced and connecting two engaging portions 15 respectively; the pipe head 11 is pivotally connected to the bottom of the handle bar stem in front of the triangular bike frame, the two engaging portions 15 on the bottoms of the branch pipes 12, 13 are used to mount a front wheel and to support and afford rotation of the front wheel.

Therefore, the pipe like head 11 of the front fork 1 must be round in order to pivotally connect the handle bar stem; the branch pipes 12, 13 of the front fork 1 have to keep an angle "a" in order to straddle and mount on the wheel axle of the front wheel; and the branch pipes 12, 13 of the front fork 1 made of aluminum alloy are made tapered pipes to get the effect of scattering the stress thereon, the tapered pipes are gradually enlarged toward the upward direction to effectively absorb the reaction from the front wheel; and more, the branch pipes 12, 13 are made curved, so that resistive arms are formed between the handle bar and the wheel axle of the front wheel, the resistive arms can provide twisting moment to reduce the force for direction switching. Under these essential conditions, manufacturers can not make the front fork 1 by an integrate forming method due to larger shape variation of the pipe head 11 and the branch pipes 12, 13, therefore, the round pipe head 11 and the branch pipes 12, 13 are always made separately for shaping, so that pipe head 11 is provided on the bottom end thereof with two connecting ends 110 in order to be inserted in the top pipe holes 120 of the branch pipes 12, 13, and then apply adhesive on the junctions, so that the junctions have adhesion joints 14, similarly, the pipe holes 130 on the bottom ends of the branch pipes 12, 13 are also connected by insertion, and the two engaging portions 15 having each a connecting end 150 are fixed with adhesive, in this way, the conventional front aluminum alloy fork 1 is made (as shown in FIG. 1).

Although such adhesive fixing of the connecting ends 110 and 150 to connect the pipe like head 11 and the engaging portions 15 onto the branch pipes 12, 13 is the customary way used in the art, the problem is, there is larger shape variation by bending on the pipe like head 11 and the branch pipes 12, 13, this area is a place where effective scattering of stress is harder, and the conventional adhesive connecting and fixing renders the junctions of the pipe like head 11 and the branch pipes 12, 13 to be subjected to damage of stress concentration; on the countrary, the junctions between the bottom ends of the branch pipes 12, 13 and the engaging portions 15 have smaller shape variation and transferring of stress is smooth although they also are connected by adhesion, so that stress concentration will not induce in these areas; hence as to the front aluminum alloy fork 1 made from the conventional technique, the pipe like head 11 and the branch pipes 12, 13 having larger shape variation by bending are difficult to be integrately formed, this has been the serious impediment for advancing technically to high quality in the art, and this is the motive of providing of the present invention.

SUMMARY OF THE INVENTION

Therefore, the primary object of the present invention is to provide an integrate forming method for the front aluminum alloy fork of a bicycle, by using a sequential novel process including material selection, milling, die core disposing, diameter reducing and tapering of the pipe head, a first stage forming, tapering of the branch pipes, a second stage forming and bending forging etc., the front aluminum alloy fork can be integrately formed, in this way, the disadvantage of stress concentration in the conventional adhesive connecting and fixing technique can be gotten rid of, and good appearance as well as strength of the front fork can be improved by such a process.

In the process of the present invention, an aluminum alloy extrusion pipe having therein two elliptical pipe holes is used as a blank and is milled by a milling machine to form in advance a pipe casting of the front fork having a round pipe head connected with two elliptical branch pipes, the front fork is beneficial to the processes of mounting and dismantling of die cores, tapering of the pipe head, the first stage forming, tapering of the branch pipes, the second stage forming and bending forging etc.

And in the process of the present invention, the die cores used are those having plasticity and filled with plastic, and belong to a technique provided by the inventor of the present invention having U.S. Ser. No. 08/798,970 and CIP Ser. No. 09/025,493), in this technique, a shaped plastic film made of PVC or PET is loaded with fillers and is sealed, the fillers used can be made by adding therein plastisol and iron sand, or steel beads which are mixed up uniformly, this technique is used in the present invention to render the die cores to have the desired forging strength and plasticity and to be beneficial to the strength required by the bearing pipe wall in plastic changing of shape, and to be beneficial to mounting and dismantling of the die cores.

Moreover, in tapering of the pipe head, a pipe tapering mould is used to forge the pipe head of the front fork, the pipe head can thus be tapered in advance and forms two shoulders, this is beneficial to the process of forging or forming etc. of the front fork in separated stages of the process.

When in the first stage forming of the process of the present invention, a pair of half forming dies are used to execute a forming process on the pipe head of the front fork, and simultaneously to forge the two elliptical branch pipes into round branch pipes, this is beneficial to the subsequent process of tapering of the branch pipes.

In tapering of the branch pipes of the present invention, a branch pipe tapering die having two screw typed diameter-reducing die cavities is used to reduce the diameter of the branch pipes to form tapered shapes, in such a tapering technique, screw typed cavity walls with their diameters reduced gradually are used and pushed on to contact and forming the branch pipe walls, the branch pipe walls therefore are tapered to get their desired variation in diameter, shape and the angle of tapering according to the speed of pushing on and the angles of tapering of the screw typed cavity walls, forming of the tapered pipes can thus be completed.

As to the process of the second stage forming of the present invention, a forming die set including a pipe head protecting die, a mountain shaped die and two branch-pipe protecting dies is used to execute the process of forming on the front fork, and to form the arciform bottom of the pipe head, and to make the two branch pipes straddle a given angle.

The pipe bending technique in the present invention uses a pair of half swaging dies (for bending pipes) are closed together to execute forming on the two branch pipes, the pipe head can be simultaneously held and protected in the half forming dies in order that the pipe walls of the branch pipes can be smoothly formed, and the desired curvatures of the branch pipes can be obtained.

Accordingly, the present invention is capable of integrately forming a front fork with extreme large shape variation and curvature, this is the area of technique where the conventional techniques are unable to reach, but the present invention can complete step by step such forming technique.

The present invention will be apparent after reading the detailed description of the preferred embodiment thereof in reference to the accompanying drawings.

BRIEF DESCRIPTION OF THE DRAWINGS

In the drawings:

FIG. 3 is a sectional view of the blank;

FIG. 3a is a sectional view of the blank following preliminary milling;

FIG. 4 is a sectional view taken from the section line 4—4 in FIG. 3;

FIG. 5 is a sectional view taken from the section line 5—5 in FIG. 3;

FIG. 14 is a sectional view showing the front fork of the present invention following the diameter reducing process;

FIG. 14a is a sectional view do the front fork during the second forming process;

FIG. 15 is a sectional view taken from the section line 15—15 in FIG. 14;

FIG. 16 is a sectional view taken from the section line 16—16 in FIG. 14;

DETAILED DESCRIPTION OF THE PREFERRED EMBODIMENT

Figure 1:
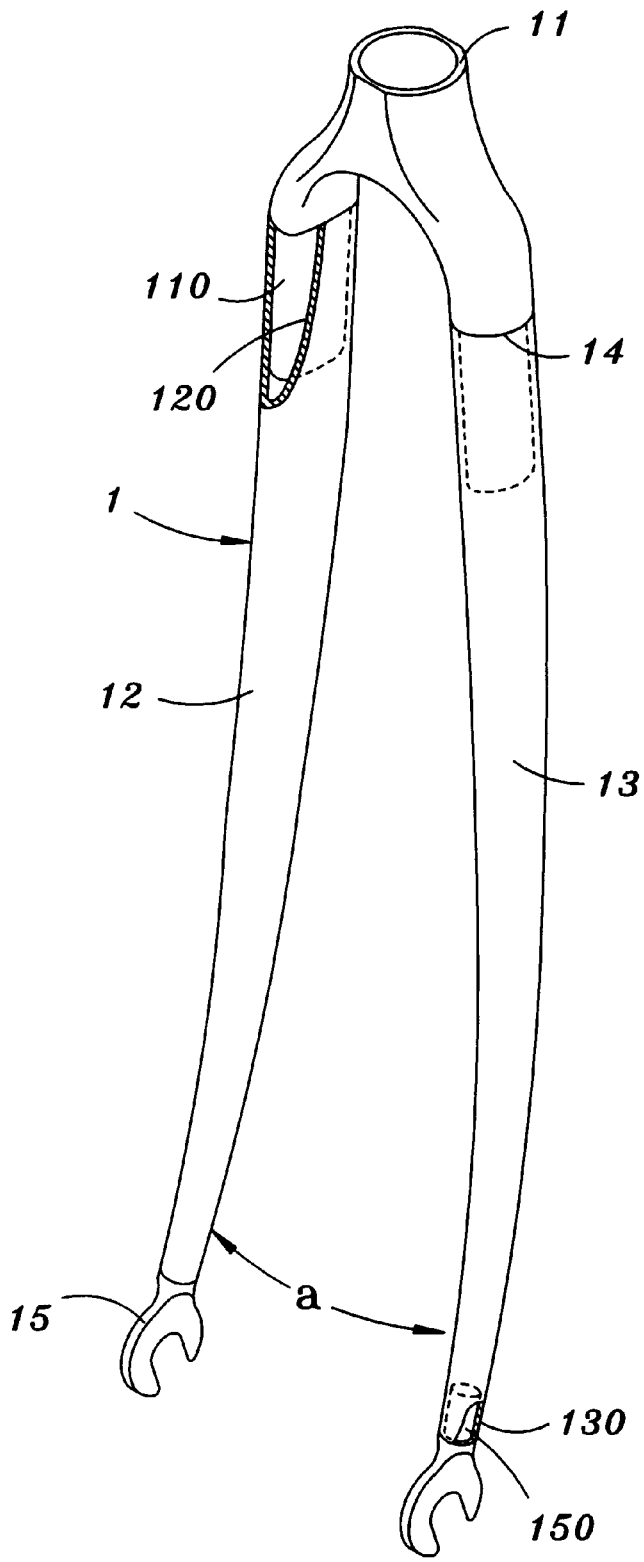
FIG. 1 is a perspective view of a conventional front fork combined with adhesive.
Figures 2, 2A:
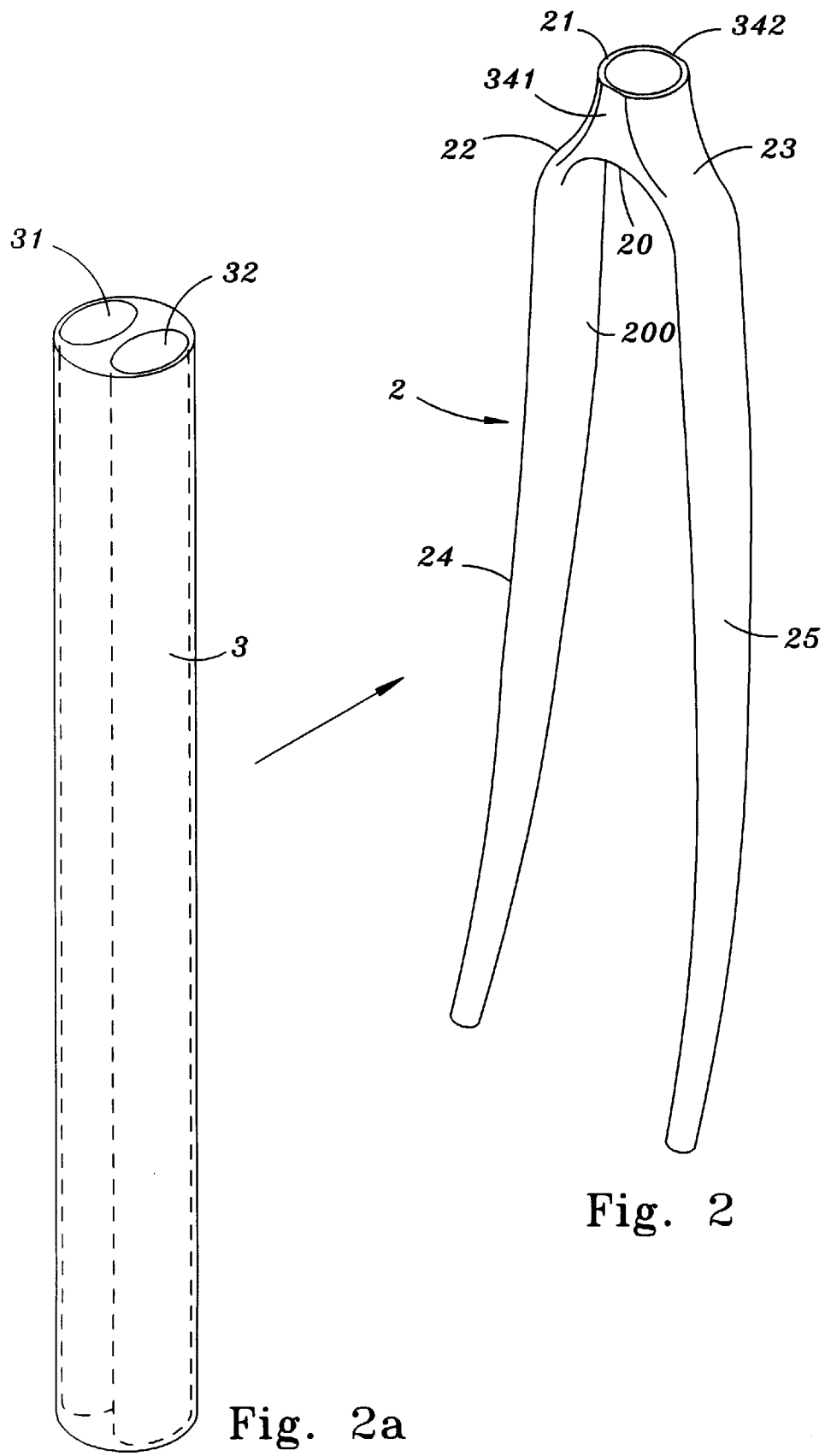
FIG. 2 is a perspective view showing the front fork of the present invention.
FIG. 2a is a perspective view of the blank used in the forming precess.

Referring firstly to FIG. 2, in the method of the present invention in integrate forming of the aluminum alloy front fork 2 of a bicycle, an aluminum alloy formed round pipe 3 having therein two elliptical pipe holes 31, 32 is used as a blank for integrate forming of the front fork 2 of the bicycle having a shaped pipe head 21 and two shoulders 22, 23 which connect integrately with two shaped branch pipes 24, 25.

As shown in FIG. 3, the method of the present invention includes a milling process, wherein, a suitable shaping milling machine is used to form in advance a round hole 33 having a predetermined depth in the aluminum alloy formed round pipe 3, so that the aluminum alloy formed round pipe 3 is formed an embryonic form 34 of the pipe head 21 having the round hole 33 (referring to FIG. 4); the walls not milled between the elliptical pipe holes 31, 32 which communicate with each other are milled now with another suitable shaping milling-machine to form a slit 35 and two elliptical branch pipes 36, 37 of the round pipe blank 3 having the elliptical pipe holes 31, 32 (referring to FIG. 5); in this way, the round hole 33 of the embryonic form 34 of the pipe head 21 is communicated with the elliptical pipe holes 31, 32 of the two elliptical branch pipes 36, 37, thus a pipe casting 30 of the front fork 2 is formed (as shown in FIG. 3).

Figure 6:
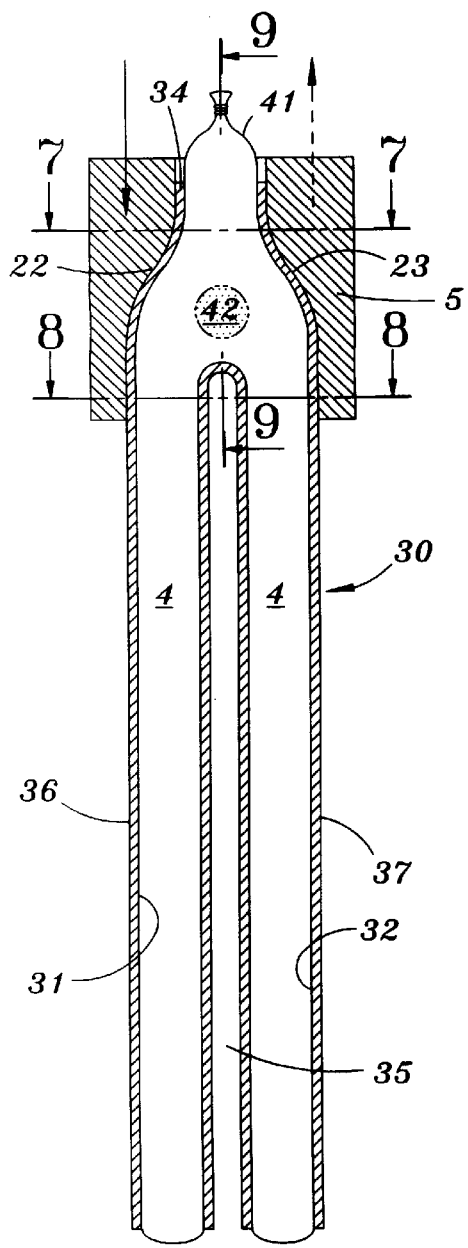
FIG. 6 is a sectional view showing die core disposing in the front fork and tapering of the pipe head of the present invention.
Figure 7:
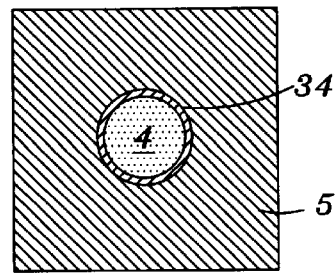
FIG. 7 is a sectional view taken from the section line 7—7 in FIG. 6.
Figure 8:
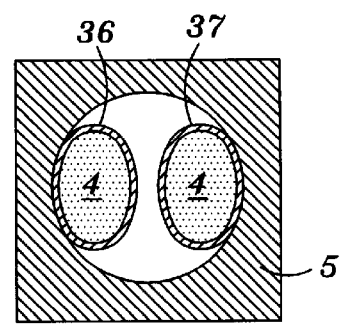
FIG. 8 is a sectional view taken from the section line 8—8 in FIG. 6.
Figure 9:
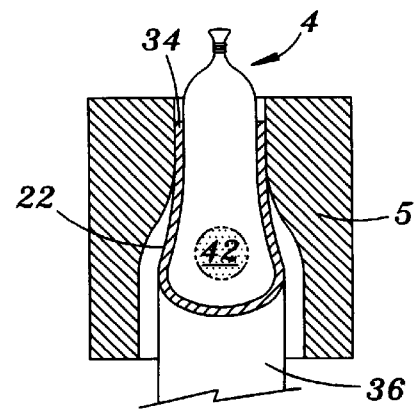
FIG. 9 is a sectional view taken from the section line 9—9 in FIG. 6.

Then the process of die core disposing and tapering of the pipe head is proceeded, wherein, the round hole 33 of the embryonic form 34 on the pipe casting 30 and the elliptical pipe holes 31, 32 of the two branch pipes 36, 37 communicating with each other are placed therein die cores 4 filled with plastic (referring to FIG. 6); then a pipe head diameter-reducing die 5 is used to reduce the diameters of the embryonic form 34 on the pipe casting 30, so that the embryonic form 34 of the pipe head 21 is reduced in its diameter to form a diameter-reduced pipe head with two shoulders 22 and 23 (as shown in FIG. 6), the die cores 4 filled with plastic in the pipes can afford large plastic shape variation of the pipe walls, so that the aluminum alloy embryonic form 34 of the pipe head 21 with limited forming strength is able to be completed to have the two shoulders 22, 23 (as shown in FIG. 2). In this process, the two branch pipes 36, 37 are not processed by the pipe head diameter-reducing die 5, hence they keep the shapes of the elliptical pipe holes 31, 32 (referring to FIG. 8), and by supporting of the die cores 4 filled with plastic, the embryonic form 34 of the pipe head 21 having its diameter reduced, the two shoulders 22, 23 and the two branch pipes 36, 37 form the embryonic shape of the front fork 2 (referring to FIG. 9).

Figure 10:
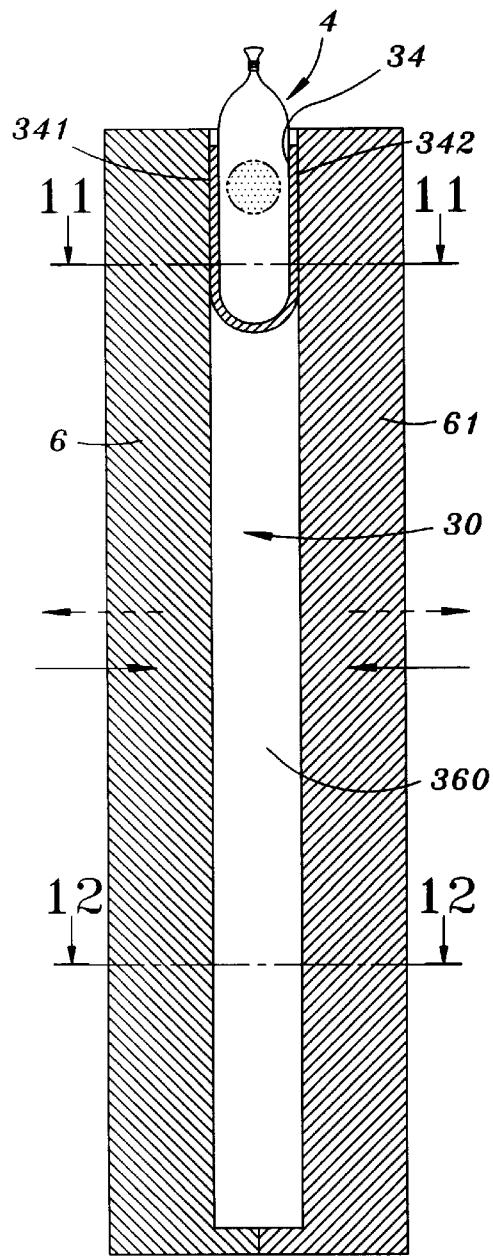
FIG. 10 is a sectional view showing the process of the first swaging stage of the front fork of the present invention.
Figure 11:
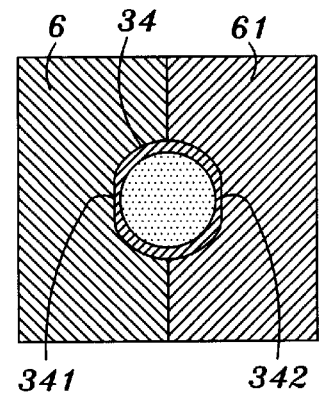
FIG. 11 is a sectional view taken from the section line 11—11 in FIG. 10.

Thereafter, the step of the first stage forming on the pipe casting 30 of the front fork 2 is executed, a pair of half forming dies 6, 61 (as shown in FIG. 10) are used to form the whole pipe casting 30, so that the pipe walls on both sides of the embryonic form 34 of the pipe head 21 (having its diameter reduce) can be formed to form two planes 341 and 342 with increased strength (referring to FIG. 11), while the two branch pipes 36, 37 are simultaneously shaped to form two branch pipes 360, 370 with round holes (referring to FIG. 12), this is beneficial to the subsequent process of tapering of the branch pipes. The die cores 4 in the pipes can scatter the forming pressure, so that all the pipe walls of the pipe casting 30 will not be deformed by overloading.

Figure 12:
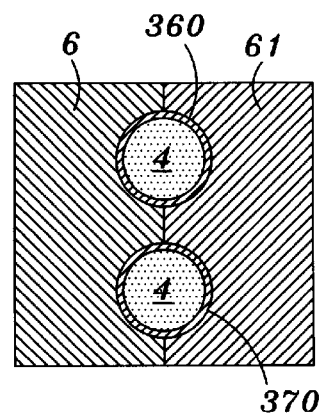
FIG. 12 is a sectional view taken from the section line 12—12 in FIG. 10.
Figure 13:
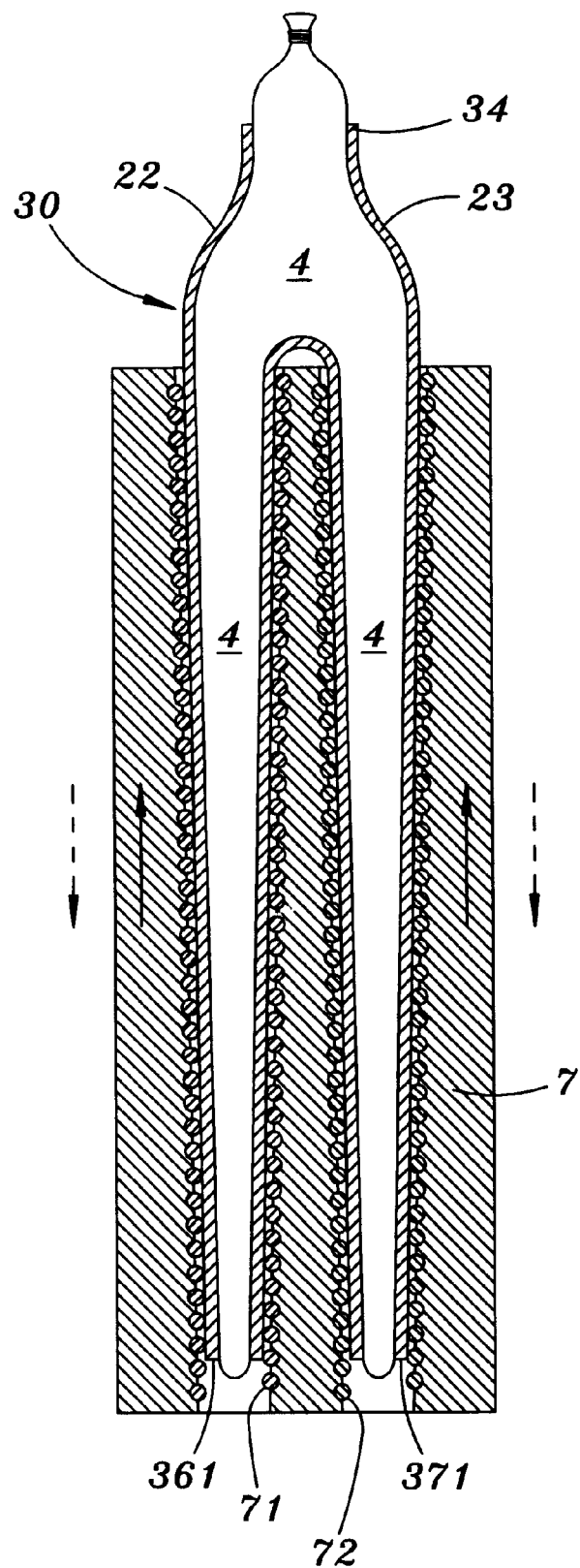
FIG. 13 is a sectional view showing the process of forming of the branch pipes of the front fork of the present invention.

And then the two branch pipes 360, 370 of the formed pipe casting 30 are under the processing step of diameter reducing; wherein, a set of diameter-reducing die 7 for the branch pipes and with two threaded walls 71, 72 for diameter reducing (as shown in FIG. 13) is pushed on to the two branch pipes 360, 370 (as shown in FIG. 12), so that the two threaded walls 71, 72 can be used to reduce the diameters of the two branch pipes 360, 370 gradually to render them to form two tapered round branch pipes 361, 371 with desired tapering angles (as shown in FIG. 13). In the step of diameter reducing of the branch pipes the die cores 4 in the pipe casting 30 is also essential tools for supporting the pipe walls to resist the gradual forming action of the two threaded walls 71, 72 in diameter reducing.

The pipe casting 30 after completion of the step of diameter reducing of the branch pipes, is then under the second stage forming process, wherein, a forming die set 8 comprised of a pipe head protecting die 81, a mountain shaped die 82 and two branch-pipe protecting dies 83 is used to execute the process of forming on the pipe casting 30 of the front fork 2 (as shown in FIG. 14). And wherein, a die cavity 810 having the actual contour of the shaped pipe head 21 is provided in the pipe head protecting die 81, and is slipped over the embryonic form 34 and the two shoulders 22, 23 thereof; the two branch-pipe protecting dies 83 are provided with semi-circular die cavities 830 formed by partial semi-circular walls of the two tapered round branch pipes 361, 371 (referring to FIG. 15), and springs 831 and 832 are provided between the exterior wall of the two branch-pipe protecting dies, 83 and a base wall 833; before forming, the semi-circular die cavities 830 are fitted over the two tapered round branch pipes 361, 371 respectively; the mountain shaped die 82 is provided on the head and the lateral sides thereof with a die portion 820 having the actual contour of the straddling portion 20 of the front fork 2 and two die portions 821 having the actual contour of two flatened arciform portions 200 extended from the die portion 820.

When in the process of second stage forming (.as shown in FIG. 14), the mountain shaped die 82 is inserted from outside into the slit 35 between the two tapered round branch pipes 361, 371, so that the two tapered round branch pipes 361, 371 and the two branch-pipe protecting dies 83 supporting outside thereof are all pressed to form a straddling angle "a", so that the branch-pipe protecting dies 83 can absorb the action force in insertion by means of the springs 831, 832 provided between the exterior wall of the two branch-pipe protecting dies 83 and the base wall 833. Once the mountain shaped die 82 is inserted and engaged with the branch-pipe protecting dies 83 at both sides and the pipe head protecting die 81 at the top thereof, the embryonic form 34 embedded in the pipe head protecting die 81 and the two shoulders 22, 23 thereof are all treated to form the actual shape required for the shaped pipe head 21, and the bottom straddling portion 20 is also formed by the mountain shaped die 82 to get the contour with an actual curvature required, the inner walls of the two tapered round branch pipes 361, 371 are formed by the mountain shaped die 82 to get the actual contour of the flatened arciform portions 200 which are jointed with the semi-circular pipe walls supported by the two branch-pipe protecting dies 83 (referring to FIG. 15), at this time, the lower portions of the two tapered round branch pipes 361, 371 are not yet formed by the mountain shaped die 82 and therefore are still in the shape of round pipes (referring to FIG. 16), and the process of forming is completed now.

Figure 17:
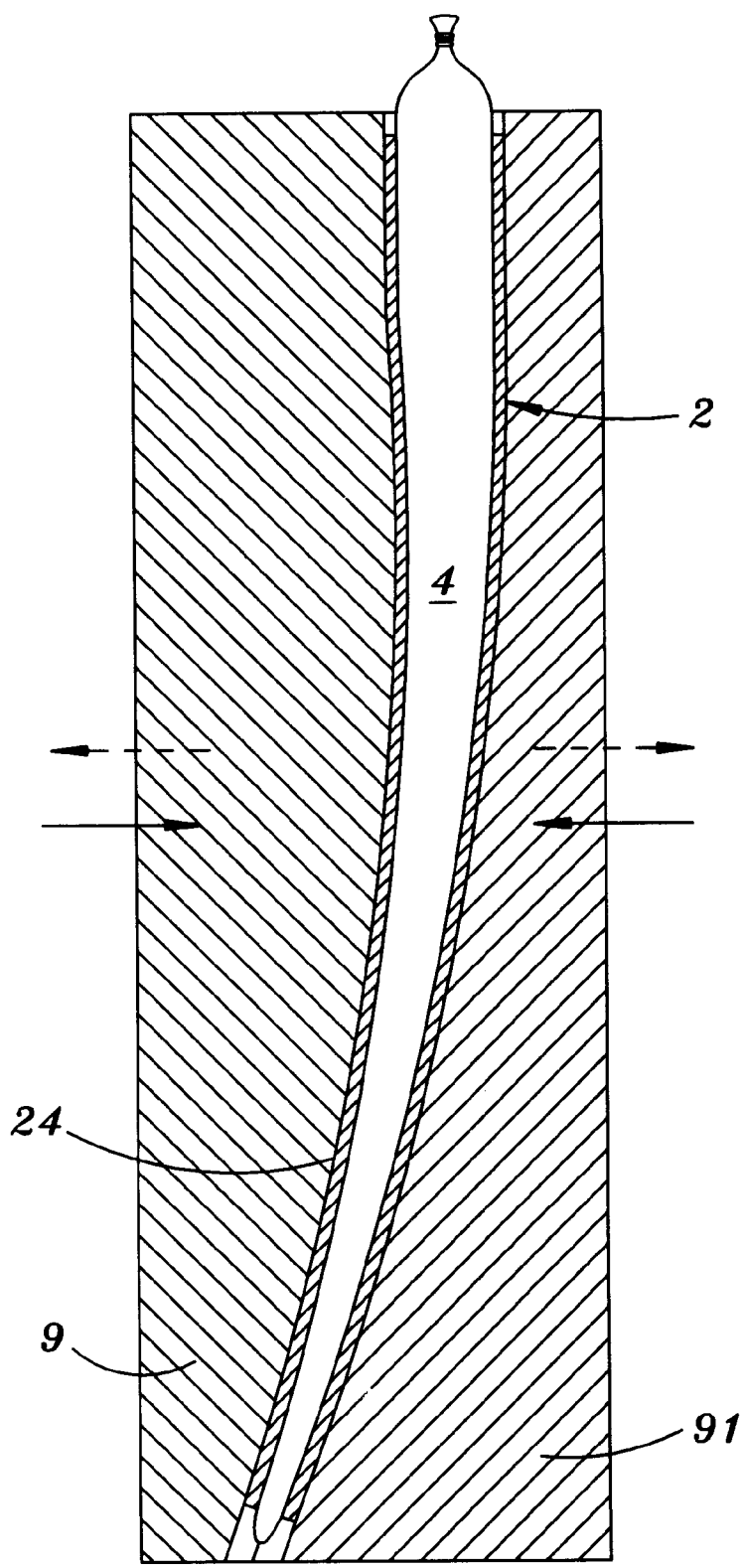
FIG. 17 is a sectional view showing the process of bending forming of the front fork of the present invention.

Thereafter, the shaped pipe head 21, the two shoulders 22, 23, the straddling portion 20, the straddling angle "a" and the pipe casting 30 with the two tapered round branch pipes 361, 371 having the flatened arciform portions 200 are all placed in a pair of half bending forming dies 9 and 91 to execute bending forming on the pipe casting 30 (as shown in FIG. 17), so that the two tapered round branch pipes 361, 371 are bending formed to get actual curvatures required for mounting a front wheel.

Figure 18:
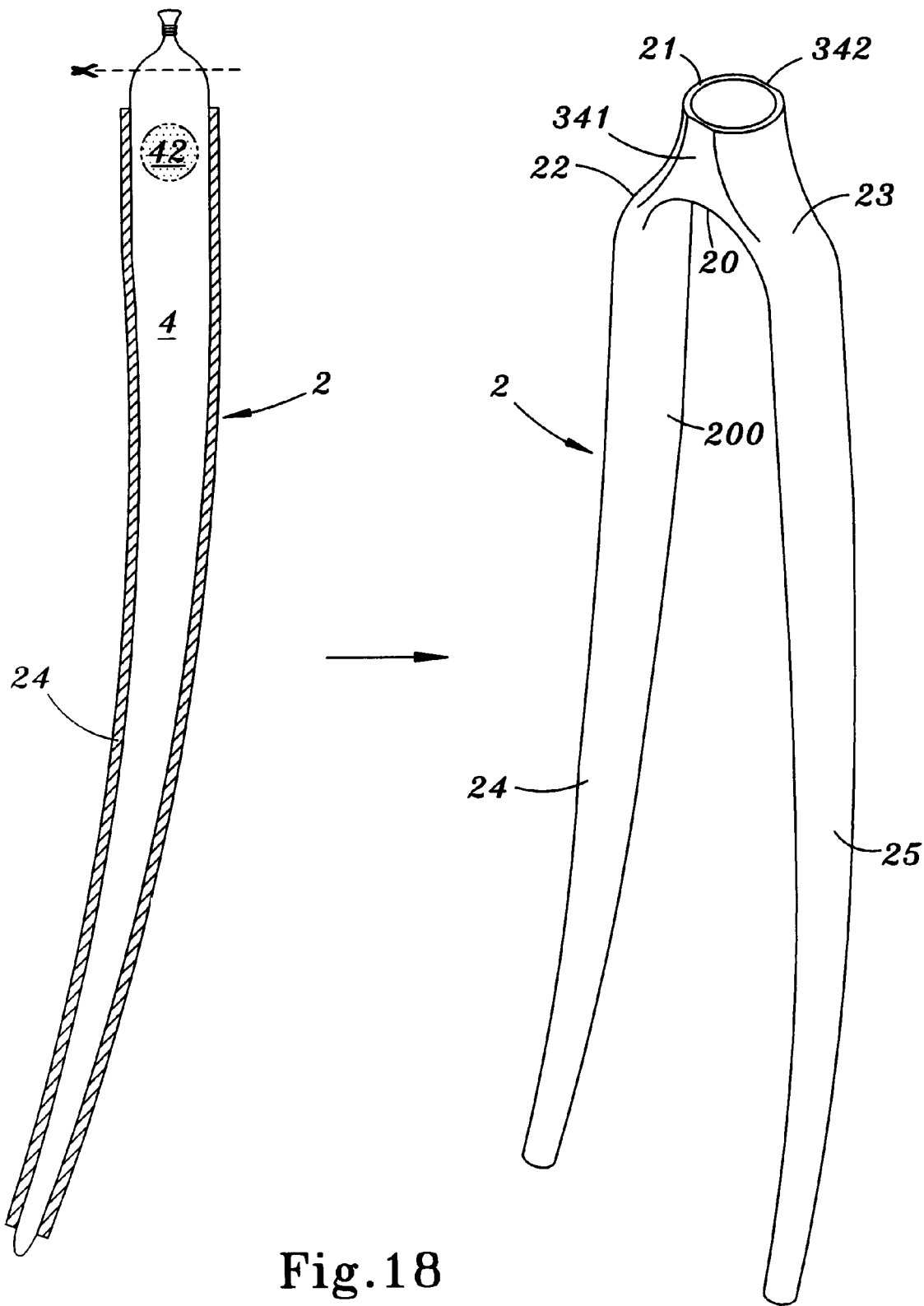
FIG. 18 is a sectional view showing the hollow front fork of the present invention integrately formed after removing of die cores filled with plastic.

When the bending forming is completed, i.e., when the required actual contour of the front fork 2 integrately formed is obtained, the die cores 4 shall be taken out of the pipes, the mouths of the die cores 4 are cut and the soft die cores 4 can be shaken and pushed to be taken out of the shaped pipes, and the shaped hollow pipe wall contour, of the front fork 2 can thereby be presented (as shown in FIG. 18), now required strength and good appearance of the front fork 2 can be obtained.

In the foregoing process, using of the plastic die cores 4 filled with plastic in favor of mounting and dismantling is the technique disclosed in the prior applications of the inventor of the present invention (with U.S. Ser. No. 08/798, 970 and CIP Ser. No. 09/025,493). In this prior technique, the opening or mouth of a plastic film 41 made of PET or PVC plastic material is sealed after it is filled therein with fillers 42, the kinds of the fillers 42 include a mixer of plastisol, iron sand or steel beads, and this is used in the present invention, the die cores thereby can have the required swaging strength and plasticity, this is beneficial to the requirement of strength, of the bearing pipe walls in moulding, and is beneficial to mounting and dismantling of the die cores (as shown in FIGS. 6 to 13).

Further, in the diameter-reducing die set 7, the dies thereof are all provided with diameter-reducing threaded walls in pursuance of the requirement of the contours of the diameter reduced pipes, so that the diameter-reducing threaded walls gradually reduce their diameters, and form the shapes and tapering angles of the pipe walls of the workpiece.

In the present invention, in additionally, before the pipe casting 30 is placed therein with the die cores 4, they must be treated with artificial aging treatments to increase the plastic strength thereof; and more, when the front fork 2 integrately formed is completed and is taken out of the die cores 4, the shaped hollow front fork 2 shall be done with heat treating to increase strength after shaping of the parts thereof; however, such heat treating varies in pursuance of the characteristics of the material of the aluminum alloy selected, for example, heat treating can cooperately use temper T4 and T6 treatment etc., so that strength and capability of shaping can be coordinated and equalized, this is beneficial to the continuous moulding process; however, such heat treating techniques are all conventional techniques, and are only used in cooperation with the present invention rather than the principal feature of the present invention.

Accordingly, although the die equipments in the process of the present invention are conventional, combination of them from the step of material selection to the steps thereafter for the technique of integrately forming the aluminum alloy front fork 2 has never seen in the markets, and this can largely contribute to increasing of strength and quality of the front fork 2, and therefore is a highly improved technique.

Having thus described the technical process of my invention, what I claim as new and desire to be secured by Letters Patent of the United States are:

1. An integrated method to form a front fork for a bicycle comprising the following steps:
    (a) selecting an aluminum alloy pipe as a blank, said blank includes two elliptical through holes therein;
    (b) milling a round hole in a first end of said blank so that a pipe head is defined, and milling a slot at a second end of said blank between said elliptical through holes, thereby forming said blank into a pipe casting of said front fork;
    (c) forming a die core in said pipe casting, said die core comprises a plastic film made of PVC or PET, loading said plastic film with a filler comprising plastisol and iron sand or steel beads uniformly dispersed in said plastisol, and then sealing said plastic film;
    (d) tapering said pipe head with a diameter-reducing die to reduce a diameter of said pipe head and to form two shoulders below said pipe head;
    (e) first stage forming during which a pair of half forming dies are used to swage said pipe casting, shaping said two elliptical branch pipes to form two branch pipes, each said branch pipe including a round though hole and two flat sides;
    (f) tapering said branch pipes by using diameter-reducing dies with threaded walls thereby forming said branch pipes into tapered round branch pipes;
    (g) second stage forming comprising utilization of a die set that includes a pipe head protecting die, a mountain-shaped die, and two spring-loaded branch pipe protecting dies, inserting said mountain-shaped die into said slot and mounting said branch pipe protecting dies on the outer sides of said branch pipes, and then fitting said head protecting die around said pipe head, thereby forming said pipe head and said branch pipes to the desired shape, said branch pipes including two arciform portions;
    (h) bending forging said branch pipes to a desired contour; and
    (i) removing said die core from said pipe casting; such that said pipe head and said branch pipes are integrally formed from said aluminum alloy pipe.

2. The process as defined in claim 1 wherein:

milling said round hole in said first end of said blank, such that said round hole and said elliptical through holes are in communication with each other.

* * * * *